(No Model.)

E. F. OSBORNE.
PIPE COUPLING.

No. 249,977. Patented Nov. 22, 1881.

Witnesses—
F. B. Townsend
W. C. Adams.

Inventor—
Eugene F. Osborne
per M. E. Dayton
Attorney

UNITED STATES PATENT OFFICE.

EUGENE F. OSBORNE, OF ST PAUL, MINNESOTA.

PIPE-COUPLING.

SPECIFICATION forming part of Letters Patent No. 249,977, dated November 22, 1881.

Application filed May 2, 1881. (No model.)

*To all whom it may concern:*

Be it known that I, EUGENE F. OSBORNE, of St. Paul, in the county of Ramsey and State of Minnesota, have invented certain new and useful Improvements in Pipe-Couplings; and I do hereby declare that the following is a full, clear, and exact description thereof, reference being had to the accompanying drawings, and to the letters of reference marked thereon, which form a part of this specification.

This invention has for its object to provide means for making connections with a pipe—as a gas, steam, or water pipe—while under pressure; and it consists in the several features of construction and operation hereinafter set forth, and pointed out in the claims.

Figure 1:
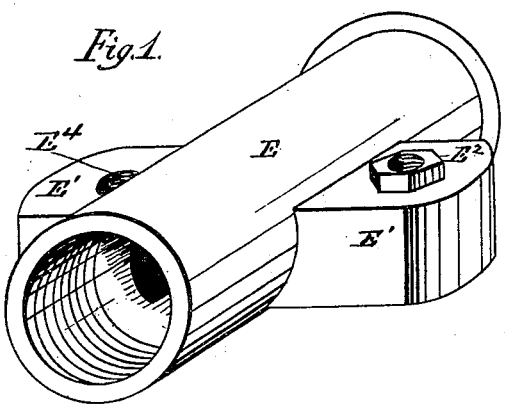
Figure 2:
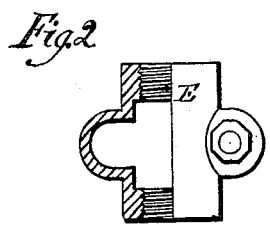
Figure 3:
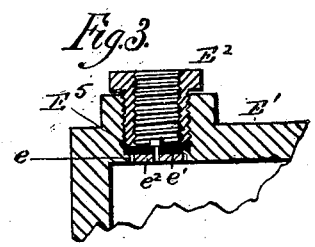
Figure 4:
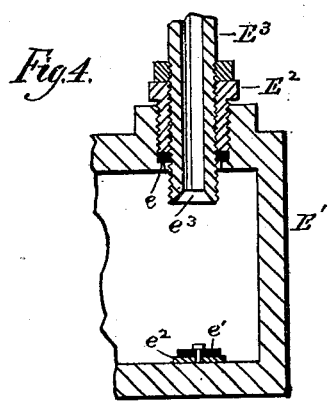
Figure 5:
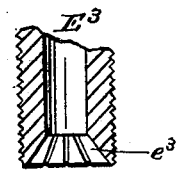

Figure 1 is a perspective view of the coupling. Fig. 2 is a plan, in partial horizontal section, of same. Fig. 3 is a fragmentary vertical section of coupling through the wing. Fig. 4 is a similar section, showing the connecting tap or nipple as it appears after the connection is complete. Fig. 5 is a detached view of the nipple or connecting section of pipe, showing notched cutting-edge.

The same letter indicates the same part in all the figures.

E represents the coupling as a whole.

E' E' are lateral chambered wings, interiorly communicating with the main passage of the coupling.

$E^2$ is a bush, having a threaded aperture of proper size to admit the proposed connecting-pipe. Said bush is threaded into the aperture $E^4$ and bears against the annular shoulder $e$, preferably narrower than the thickness of the bush. Between the bush $E^2$ and shoulder $e$ is interposed a disk, $E^5$, preferably constructed of the disk $e'$, of rubber packing or other suitable material, having the metal disk $e^2$ secured thereto. In this construction of $E^5$ the disk $e^2$ is as large or larger than the aperture of the bush $E^2$, and bears upward against the bush, making, by means of the intervening packing $e'$, a close joint therewith when the pipe containing the coupling is under pressure.

$E^3$ is a tap or nipple by which connection is to be made with the coupling E. Said tap is beveled outwardly at its lower end, as shown at $e^3$ in Figs. 4 and 5. When the connection is to be made this nipple $E^3$ is run down against the packing $e'$, and is worked backward and forward, and gradually inward or downward, until the packing is cut through by the edge $e^3$. The central portion of the packing thus cut out, and having the metal disk $e^2$ attached thereto, falls to the bottom of the chamber, as shown in Fig. 4, leaving the connection complete.

To facilitate the falling of the central severed disk after being cut out, the nipple may have one or more notches in the edge $e^3$, or the beveled face of said edge may be serrated or rough to prevent a close joint with the packing. The admission of fluid to the nipple or connection through such notches, or about the dissevered disk, will equalize the pressure on both sides of the same, so as to allow it to fall by gravity.

The disk $E^5$, instead of being composed of the parts $e'$ and $e^2$, may be a single disk of metal or other material at once adapted to be cut, and strong enough to resist the outward pressure within the coupling.

This invention is substantially shown, but not claimed, in Letters Patent No. 236,247, granted to me January 4, 1881.

I claim as my invention—

1. In a pipe-joint, the combination of the part having the aperture $E^4$ provided with the shoulder $e$, the bush $E^2$, exteriorly threaded to enter said aperture, and interiorly threaded to receive the proposed connection, and the packing-disk $E^5$, substantially as and for the purposes set forth.

2. In combination with the coupling E, having the bush $E^2$ and disk $E^5$, arranged as described, the nipple $E^3$, adapted to be run into the bush and to detach the central portion of the disk, substantially as and for the purposes set forth.

3. The coupling E, having the aperture $E^4$ and annular shoulder $e$, combined with the bush $E^2$ and disk $E^5$, said disk being composed of the packing $e'$ and rigid central disk, $e^2$, substantially as and for the purposes set forth.

4. The coupling E, provided with lateral chambered wings E', apertured to admit the branch connection vertically and outside the course of the main passage of the coupling, substantially as described.

In testimony that I claim the foregoing as my invention I affix my signature in presence of two witnesses.

EUGENE F. OSBORNE.

Witnesses:
M. E. DAYTON,
JESSE COX, Jr.